United States Patent [19]

Covezzi et al.

[11] Patent Number: 5,733,987
[45] Date of Patent: Mar. 31, 1998

[54] PROCESS FOR THE GAS-PHASE POLYMERIZATION OF OLEFINS

[75] Inventors: Massimo Covezzi; Paolo Galli; Gabriele Govoni, all of Ferrara; Roberto Rinaldi, Mantova, all of Italy

[73] Assignee: Montell Technology Company, Hoofddorp, Netherlands

[21] Appl. No.: 30,654

[22] Filed: Mar. 12, 1993

[30] Foreign Application Priority Data

Mar. 13, 1992 [IT] Italy ................... MI92A0589

[51] Int. Cl.$^6$ ........................................ C08F 2/34
[52] U.S. Cl. ................... 526/65; 526/88; 526/901; 526/75
[58] Field of Search ................ 526/75, 65, 88, 526/901

[56] References Cited

U.S. PATENT DOCUMENTS

| | | | |
|---|---|---|---|
| 3,954,909 | 5/1976 | Havas et al. | 526/75 |
| 4,128,607 | 12/1978 | Shiomura et al. | 526/75 |
| 4,298,713 | 11/1981 | Morita et al. | 526/75 |
| 4,525,547 | 6/1985 | Kato et al. | 526/75 |
| 5,241,023 | 8/1993 | Brule et al. | 526/75 |

FOREIGN PATENT DOCUMENTS

| | | |
|---|---|---|
| A-0 024 933 | 3/1981 | European Pat. Off. . |
| 050477 | 4/1982 | European Pat. Off. . |
| A-0 050 477 | 4/1982 | European Pat. Off. . |
| A-0 415 588 | 3/1991 | European Pat. Off. . |
| A-0 517 183 | 12/1992 | European Pat. Off. . |
| 7703570 | 10/1977 | Netherlands . |

OTHER PUBLICATIONS

EPO Search Report (with Annex), dated Jul. 6, 1993.

*Primary Examiner*—Thomas R. Weber
*Attorney, Agent, or Firm*—Bryan Cave LLP

[57] ABSTRACT

Process for the gas-phase polymerization of ethylene and ethylene mixtures with α-olefins $CH_2=CHR$ in the presence of a high activity catalyst comprising a titanium compound containing at least one Ti-halogen bond, supported on magnesium dichloride in active form said process comprising the steps of: (a) contacting the catalyst component; (b) prepolymerizing ethylene or ethylene mixtures with α-olefins in order to produce a polymer amount of from approximately 5 g per g of solid component, up to an amount corresponding to about 10% of the final catalyst yield; (c) polymerizing ethylene or ethylene mixtures with α-olefins in the gas-phase, in the presence of the prepolymer-catalyst system obtained in (b), while maintaining in the gas phase a molar concentration concentration of the alkane comprised between 20 and 90% with respect to the total gases.

12 Claims, 1 Drawing Sheet

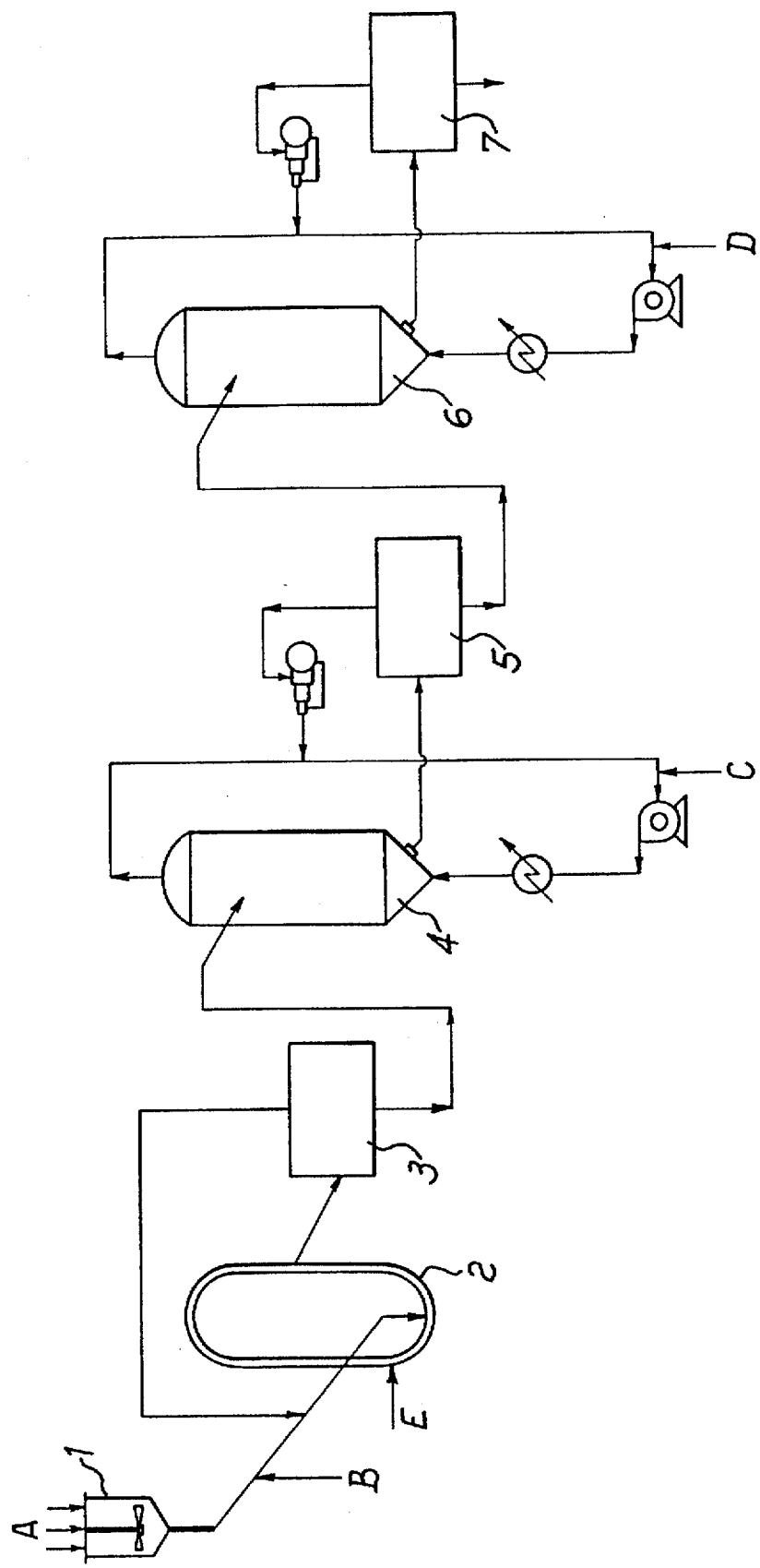

PROCESS FOR THE GAS-PHASE POLYMERIZATION OF OLEFINS

The present invention relates to a process for the gas-phase polymerization of ethylene and ethylene mixtures with α-olefins of the formula $CH_2=CHR$, in which R is an alkyl, cycloalkyl or aryl radical with 1 to 12 carbon atoms, said polymerization being carried out in one or more reactors having a fluidized bed or a mechanically agitated bed, in the presence of a highly active catalyst comprising a titanium compound containing at least one Ti-halogen bond supported on magnesium dihalide in active form.

It is known to continuously polymerize one or more olefins, such as ethylene or propylene, in the gas phase in a reactor with a fluidized or mechanically stirred bed, in the presence of a catalyst based on a compound of a transition metal belonging to groups IV, V or VI of the Periodic Table of the Elements, in particular in the presence of a catalyst of the Ziegler-Natta type or a catalyst based on chromium oxide.

The polymer particles are kept in the fluidized and/or stirred state in a gaseous reaction mixture containing the olefin(s). The catalyst is fed to the reactor either continuously or intermittently while the polymer constituting the fluidized or mechanically stirred bed is withdrawn from the reactor, also continuously or intermittently.

The heat of the polymerization reaction is substantially removed by the gaseous reaction mixture which passes through heat transfer devices before being recycled in the reactor. In addition, a liquid stream may be introduced into the gas-phase reactor to enhance heat removal.

When a process for the gas-phase polymerization of an α-olefin is carried out in the presence of catalysts of high activity, such as those constituted by the reaction product of an Al-alkyl compound and a titanium compound supported on active Mg-dichloride, the problem of heat removal is increased due to the low heat exchange capability of the gaseous phase.

It was observed that small changes during the course of the polymerization, resulting for example from slight fluctuations in the quality of the catalyst or the olefins used in the reaction, can cause changes in the behaviour and catalytic activity of the polymer particles and have a particularly adverse effect in the process of gas-phase polymerization. These small variations can indeed cause an unexpected increase in the amount of heat evolved during the reaction which cannot be removed sufficiently rapidly and efficiently by the gaseous reaction mixture passing through the bed. Hot spots can be generated in the bed, with consequently agglomerates of molten polymer being formed.

When hot spots appear in the bed it is generally too late to prevent the formation of agglomerates. However, if the reaction conditions are corrected sufficiently early, as by decreasing the polymerization temperature or pressure, or by reducing the rate at which the catalyst is fed into the reactor in order to avoid the adverse effect of unexpected superactivation, the amount and size of said agglomerates can be reduced to some degree. During this period, however, it will not be possible to avoid a drop in the rate of polymer production and a decay in the quality of the resulting polymer.

Usually, to avoid these disadvantages, the general polymerization conditions are chosen with a safety margin such that hot spots and agglomerates do not form. For example, catalysts with reduced activity are used. The application of such conditions, however, results either in a substantial decrease in production or in a deterioration of the quality of the polymer.

To attempt to remedy the above drawbacks, EP-A-359444 discloses the introduction into the polymerization reactor of a retarder such as a polymerization inhibitor or a catalyst poison, in order to reduce the olefin polymerization rate. However, the use of the retarder adversely affects the quality and the properties of the polymer, such as the melt index, the melt flow ratio, and/or the stereoregularity of the polymer, as well as decreasing the productivity of the process.

Besides the above described drawbacks, in the gas-phase process a mechanism that generates electrostatic charges is active, due to which catalyst and resin particles tend to adhere to the reactor walls, as a result of the electrostatic forces. In the case of fairly long residence times of the polymers in a reactive environment, a temperature excess may cause particles to melt with the resulting formation of sheets or layer of thin molten agglomerates in the granular product.

The causes of the formation of electrostatic charges are many. Among these are, the generation of charges due to friction between materials of different kind, limited static dissipation, introduction into the process of very small amounts of prostatic agents, excessive catalyst activities, etc..

A strict correlation exists between sheeting and the presence of excessive electrostatic charges (either negative or positive). This is evidenced by sudden changes in electrostatic levels immediately followed by deviation in temperature at the reactor wall. Said temperature deviations indicate particle adhesion, which causes an insulating effect and a reduced heat transfer. As a result, there is generally loss of fluidizing effectiveness and homogeneity, catalyst feed interruption can occur as well as plugging at the product discharge system.

As discussed in U.S. Pat. No. 4,532,311, the prior art relates to various processes in which electrostatic charges can be reduced or eliminated. Processes suitable for use in a fluidized bed include (1) the use of an additive to increase the conductivity of the particles, thus providing a path for electrical discharge, (2) installation of grounding devices in a fluidized bed, (3) ionization of gas or particles by electrical discharge, so as to generate ions which neutralize the electrostatic charges on said particles, and (4) the use of radioactive sources to produce radiation capable of generating ions which may neutralize electrostatic charges on the particles. However, the use of these techniques in a commercial scale reactor using a fluidized bed in general is neither easy nor practical.

In U.S. Pat. No. 4,803,251 a group of chemical additives is disclosed which generate either positive or negative charges in the reactor and which are fed to the reactor in an amount of a few ppm with respect to the monomers in order to prevent the formation of undesired positive or negative charges. The chemical additives include alcohols, oxygen, nitric oxide and ketones. Also in this case there is a resulting decrease in the polymer quality as well as a decrease in the catalyst activity.

The above said drawbacks are increased when a gas-phase polymerization process is carried out with the use of a highly active catalyst in order to produce spherical polymers having attractive morphological characteristics (high bulk density, flowability, and mechanical resistance). In this case, only a substantially complete control of the polymerization process enables one to obtain polymer particles having the above desired characteristics. This is particularly true when the gas-phase process is used to produce ethylene polymers, wherein the high polymerization kinetics of ethylene exacerbates the problem.

See also EP-A-416379, which discloses a process for preparing thermoplastic olefin polymers wherein the polymerization is carried out in at least two reactors using a catalyst based on a titanium halide supported on active $MgCl_2$. In said patent, reference is made to the possible precontacting of the preformed catalyst with small amounts of an olefin prior to the main polymerization step which is carried out in either liquid or gaseous phase.

It has now been found that it is possible to carry out a gas-phase polymerization process in a smooth and reliable way, overcoming or considerably reducing the above described difficulties, without sacrificing the catalyst productivity and/or deteriorating the polymer quality.

In particular, it has been found that it is possible to obtain ethylene polymers with high production rates, expressed in gram of polymer per gram of solid catalyst component per hours, said polymers being in the form of spherical particles endowed with high flowability and high bulk density values (by "spheriform" we mean substantially spheroidal or spherical particles).

The process of the invention consequently offers the possibility of obtaining spherical form polymers having valuable morphological characteristics, in particular in connection with the use of super-active catalysts having particle dimensions in the range of 30 to 150 µm. Such spheriform-polymers can be used without the need of a preliminary pelletization, which operation, as is known, is very expensive in terms of energy consumption. Further, the possibility of carrying out the gas-phase polymerization process with high specific productivity allows for a remarkable reduction in reactor volume.

Another advantage offered by the present process derives from the fact that starting up the gas-phase reactor does not require any "fluidizing resin bed" or any initial dispersing bed as is usually done in gas-phase processes of the prior art.

The continuous process of the present invention comprises the following steps:

(a) contacting the catalyst components in the absence of polymerizable olefin or optionally in the presence of said olefin in amounts not larger than about 20 g per g of solid catalyst component;

(b) prepolymerization, with the aid of the catalyst formed in step (a), of ethylene or mixtures thereof with α-olefins $CH_2$=CHR, in which R is a $C_1$–$C_{12}$ alkyl, cycloalkyl or aryl radical, said α-olefin(s) being present in amounts of up to 20% by moles relative to ethylene, in order to form a polymer in an amount comprised between 30 and 1000 g per g of solid catalyst components;

(c) gas phase polymerization of ethylene or mixture thereof with one or more α-olefin(s), in one or more reactor(s) having a fluidized bed or a mechanically stirred bed in the presence of the prepolymer-catalyst system formed in (b), while circulating through the reactor(s) an alkane having from 3 to 5 carbon atoms in a molar concentration in the gas phase of from 20 to 90% with respect to the total gases.

Surprisingly and unexpectedly the preforming of the catalyst, the step of prepolymerization with the catalyst and the presence of the alkane in the gas phase in the molar concentration as indicated above, make it possible to easily control the gas-phase polymerization process, without having the typical difficulties of the processes known from the prior art.

Examples of α-olefins having formula $CH_2$=CHR are: butene-1, pentene-1, hexene-1, 4-methyl-pentene-1, octene-1.

In step (a), the components which constitute the catalyst are brought into contact with an inert liquid hydrocarbon solvent such as propane, n-hexane or n-heptane, at a temperature lower than 60° C. and preferably comprised between 0° and 30° C. for about 6 seconds to 60 minutes.

The catalyst used in the process according to the present invention comprises the reaction product of the following components:

(A) a solid component comprising a titanium compound containing at least one Ti-halogen bond supported on a magnesium halide in active form. The solid component may optionally also comprise an electron donor compound (internal donor), for example when the production of LLDPE with a particularly narrow molecular weight distribution (MWD) is desired.

(B) An alkyl-aluminum compound, in particular Al-trialkyl.

(C) Optionally, for example when producing LLDPE with a particularly narrow MWD is desired, an electron donor compound (external donor) which may be the same or different from the one present in solid component (A).

The catalyst formed in step (a) is fed either continuously or intermittently to step (b).

Step (b) can be carried out in the liquid or gas phase; preferably it is carried out in the liquid phase using a hydrocarbon solvent such as n-hexane, n-heptane, cyclohexane or a low boiling alkane such as propane, butane [(kept in the liquid state under the conditions used in (b)].

The prepolymerization of ethylene in step (b) is carried out at a temperature comprised between −30° and +50° C., preferably between −10° and +30° C. The amount of the prepolymer formed ranges between 30 and 1000 g of polymer per g of solid catalyst component, and preferably between 100 and 400 g of polymer per g of solid catalyst component. The final catalyst yield can be determined by the analysis of the catalyst residues, for instance, from the titanium and/or magnesium content or from the balance of the materials.

The gas-phase polymerization of step (c) is carried out according to known techniques, operating in one or more reactors having a fluidized or mechanically stirred bed. The process is carried out at a temperature below the sintering temperature of the polymer particles. Generally the temperature is comprised between 50° and 120° C. and preferably between 70° and 100° C.

The total pressure is comprised between 1,5 and 3 MPa. As previously indicated, the gaseous phase present in the reactor(s) contains an inert $C_3$–$C_5$ alkane in an amount of from 20 to 90% by mol with respect to the total gases. Said alkane is suitably selected from the group comprising propane, butane, isobutane, n-pentane, isopentane, cyclopropane, cyclobutane. Preferably the alkane is propane.

The alkane is fed into the reactor either with the monomer or separately and is recycled with the recycle gas, i.e., the gas stream which does not react in the bed and which is removed from the polymerization zone, preferably by passing it into a speed reduction zone above the bed where entrained particles can drop back into the bed. The recycle gas is subsequently compressed and then passed through a heat exchanger before being returned to the bed. See, e.g., U.S Pat. Nos. 3,298,792 and 4,518,750 for a description of gas-phase reactors and techniques.

It is surprising and completely unexpected that in the process according to the invention, the alkanes are effective in providing the advantages as hereabove indicated, whereas the use of an inert gas like nitrogen is ineffective. Indeed, the use of nitrogen does not prevent the formation of large aggregates ("chunks"), with the consequent need to shut down the operation.

According to a preferred embodiment, the polymerization reaction is carried out in at least two reactors in series, in the first of which, where the initial amount of polymer is formed, the alkane concentration is kept at a level higher than the concentration in the second reactor (or in subsequent reactors). In general, from about 5 to 60% of the total polymer is produced in the first reactor.

In the reactors the fluidization is achieved by maintaining the recycled gas at high speeds towards and through the bed, typically of the order of about 50 times the rate of feed of make-up gas. Make-up gas is fed to the bed at a rate equal to the rate at which particulate polymer product is withdrawn.

In order to ensure complete fluidization, the recycle gas and, where desired, a part or all of the make-up gas are returned to the reactor at a point below the bed. A gas distribution plate positioned above the point of return ensures an appropriate gas distribution and also supports the resin bed when gas flow is stopped.

Hydrogen can be used as a chain transfer agent in order to control the polymer molecular weight.

BRIEF DESCRIPTION OF THE DRAWING

A typical simplified flow diagram of the process is given in accompanying FIG. 1. Reference numeral 1 indicates the apparatus in which the catalytic system is activated. The loop reactor 2 is the prepolymerizer. The gas-phase reactors are designated by 4 and 6, and the solid/gas separators are designated by 3, 5 and 7.

The catalyst components and the diluent (propane) are fed to the activation reactor 1 as indicated by arrows A. The activated catalyst is fed to loop reactor 2 as indicated by arrow B. Propylene is fed to the loop reactor as indicated by arrow E. The catalyst-prepolymer system produced is fed to the gas-phase reactor 4 or, if the separation of the produced solid matter from the fluid components is desired, to the separation unit 3 and from the latter to the gas-phase reactor 4 where, into the gas recycle line, the monomer, hydrogen and propane are fed as indicated by arrow C. The polymer leaving reactor 4, after passing through the separator 5, is fed to reactor 6, wherein the monomer, hydrogen and propane are fed as indicated by arrow D. The spherical granules of polymer are discharged from reactor 6 into separator 7. If the process contemplates one single step of gas-phase polymerization, the polymer produced is collected at separation unit 5 outlet.

The solid catalyst components used in the process of the present invention comprise a titanium compound of formula $Ti(OR^I)_nX_{7-n}$, in which $0 \leq n \leq (y-1)$, wherein y is the valency of titanium, X is a halogen, preferably chlorine, $R^I$ is a 1–12 C alkyl, cycloalkyl or aryl radical or a COR group, supported on a magnesium halide in activated form. Particularly interesting are those compounds having the above said general formula and in which y is 4, n may range between 1 and 2, X is chlorine and $R^1$ is selected among n-butyl, isobutyl, 2-ethylhexyl, n-octyl and phenyl.

The active Mg-dihalides used as support for Ziegler-Natta catalysts are described extensively in the patent literature. U.S. Pat. Nos. 4,298,718 and 4,495,338 described for the first time the use of said supports.

The Mg-dihalides forming the support of the catalyst components used in the process of the present invention are characterized by X-ray spectra wherein the most intense line which appears in the spectrum of the non-active halide is no longer present, but is substituted by a halo with the maximum intensity shifted towards lower angles with respect to the angle of the most intense line, or this line is still present but it appears broadened.

Preferably said magnesium dihalide is magnesium chloride.

The titanium compounds suitable for the preparation of the solid catalyst components include the Ti-halides such as $TiCl_4$, which is the most preferred, and Ti-trichloroalcoholates such as trichlorobutoxytitanium and trichlorophenoxytitanium. In these cases the compound of titanium may be optionally reduced by using reducing agents capable of lowering the titanium valency down to a value of less than 4.

As examples of reducing compounds, Al-trialkyl compounds or silicon compounds, such as e.g., polyhydrogenosiloxane, can be cited.

The titanium compounds can also be formed in situ, for example by reacting a titanium tetraalcoholate with a halogenating agent, such as $SiCl_4$, $TiCl_4$, halosilanes, $AlCl_3$, Al-alkyl halides. In the latter case, as the Al-alkyl halides display both halogenating and reducing activities, the resulting titanium compound will at least partially have a valency lower than 4.

Examples of solid catalytic components useable in the process of the present invention are those as described in U.S. Pat. Nos. 4,218,339 and 4,472,520, the disclosure of which is hereto incorporated by reference. The solid catalyst components can also be prepared according to the methods described in U.S. Pat. Nos. 4,748,221 and 4,803,251.

Particularly preferred for the process of the present invention are the catalytic component endowed with a regular morphology, for example spherical or spheroidal morphology. Examples of such components are disclosed in italian patent applications MI-92-A-000194 and MI-92-A-000195. By using such components, polymers can be obtained displaying valuable morphological characteristics and high bulk density values.

The titanium compound can be used in mixtures with other transition metal compounds such as vanadium, zirconium and hafnium.

The amount of titanium which is present on the support can be, for example, of up to 20% by weight as expressed by metal titanium and preferably is comprised between 1 and 16%.

Suitable internal electron-donors comprise ethers, esters, amines, ketones and diethers of the general formula:

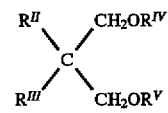

wherein $R^{II}$ and $R^{III}$ are the same or different from each other and may be alkyl, cycloalkyl and aryl radicals with 1 to 18 carbon atoms, and $R^{IV}$ and $R^{V}$ are the same or different and are alkyl radicals having from 1 to 4 carbon atoms.

Examples of said compounds include di-n-butyl-phthalate, di-isobutyl-phthalate, di-n-octyl-phthalate, 2-methyl-2-isopropyl-1,3-dimethoxypropane, 2-methyl-2-isobutyl-1,3-dimethoxypropane, 2,2-diisobutyl-1,3-dimethoxypropane, 2-isopropyl-2-isopenthylo 1,3-dimethoxypropane.

The internal donor is generally present in molar ratios with respect to the Mg of up to 1:2 and preferably comprised between 1:8 and 1:12.

The Al-alkyl compound used as the co-catalyst to prepare the catalyst in step (a) is preferably selected from Al-trialkyl compound such as, e.g., Al-triethyl, Al-triisobutyl, Al-tri-n-butyl, Al-tri-n-octyl. Mixtures of Al-trialkyls with Al-alkyl halides or Al-alkyl-sesquihalides such as AlEt$_2$Cl and Al$_2$Et$_3$Cl$_3$ may also be used. The Al/Ti ratio in the catalyst formed in step (a) is higher than 1 and generally is comprised between 20 and 800.

The external donor may be the same or different from the electron-donor present as the internal donor.

When the internal donor is an ester of a polycarboxylic acid, the external donor is preferably selected from silicon compound of the formula R$_1$R$_2$Si(OR)$_2$, where R$_1$ and R$_2$ are alkyl, cycloalkyl or aryl radicals with 1 to 18 carbon atoms, such as methylcyclohexyl-dimethoxy silane, diphenyldimethoxy silane and methyl-t-butyldimethoxy silane.

As previously pointed out, the process of the present invention is particularly suitable for the production of ethylene polymers in which the high polymerization kinetic of ethylene requires a close control of the gas-phase process in order to avoid those difficulties typical of the prior art gas-phase processes, particularly when the process is carried out with high specific productivity.

For example: high density polyethylenes (HDPE; density greater than 0.940 g/cc), including homopolymers of ethylene and copolymers of ethylene with alpha-olefins having from 3 to 12 carbon atoms; linear low density polyethylenes (LLDPE; density lower than 0.940 g/cc), and very low and ultra low density linear polyethylenes (VLDPE and ULDPE; density less than 0.920 g/cc and as low as 0.880 g/cc) consisting of copolymers of ethylene with one or more alpha-olefins having from 3 to 12 carbon atoms, with a content of units deriving from ethylene of over 80% by weight; elastomeric terpolymers of ethylene, propylene and dienes, and elastomeric copolymers of ethylene and propylene, having a content of units derived from ethylene comprised between about 30 and 70% by weight; can be obtained.

The following examples will further illustrate the present invention. Of course, variations may be supplied without departing from the spirit of the present invention.

EXAMPLES

Preparation of solid catalyst component

Under an inert atmosphere, 28.4 g of MgCl$_2$, 49.5 g of anhydrous ethanol, 10 cm$^3$ of ROL OB/30 vaseline oil, and 100 cm$^3$ of silicone oil having a viscosity of 350 cs were introduced into a reaction vessel equipped with a stirrer. The temperature was increased up to 120° C. and kept at that value until MgCl$_2$ was dissolved. The hot reaction mixture was then transferred to a 1.5 l vessel equipped with a Ultra Turrax T-45 N stirrer and containing 150 ml of vaseline oil and 150 ml of silicone oil. The temperature was maintained at 120° C. while stirring for 3 minutes at 2000 rpm. The mixture was then discharged into a 2 litre vessel equipped with a stirrer and containing 1 l of anhydrous n-heptane cooled to 0° C. and stirred at a speed of 6 m/s for about 20 minutes while maintaining the temperature at 0° C. The resulting particles were washed with n-hexane and submitted to a thermal treatment, under a flowing N$_2$ stream, within the temperature range of 50°–150° C. until spherical particles with a residual alcohol content of about 35% by weight were obtained. 300 g of this product was charged to a 5000 cm$^3$ reactor in suspension with 300 cm$^3$ of anhydrous hexane. With stirring, and at room temperature, 130 g of triethyl-aluminum (TEAL) in hexanic solution was slowly charged. The reaction mixture was heated at 60° C. for 60 minutes, then stirring was discontinued, the reaction mixture was allowed to settle and the clear supernatant phase was separated. The treatment with TEAL was repeated twice more under the same conditions, then the resulting solid product was washed with hexane and was dried at 50° C. 260 g of the so obtained support was charged to a reactor together with 3 litres of anhydrous hexane; under stirring, 242 g of Ti(OBu)$_4$ was fed at room temperature. The reaction mixture was kept stirred for 30 minutes and then 350 g of SiCl$_4$ diluted with 250 cm$^3$ of hexane was fed over 30 minutes at room temperature. The temperature was increased to 65° C. and stirring was continued for further 3 hours; the liquid phase was then separated by settling and siphoning. The solid product was then washed 7 times with hexane and the resulting component was dried at 50° C. under vacuum.

Example 1

A pilot plant having the configuration shown in FIG. 1 was used to produce HDPE. The solid component prepared according to the general procedure and a solution of triethylaluminum (TEAL) in n-hexane were fed to the activation step and from this to a slurry prepolymerization step with ethylene. The liquid phase of the suspension was propane. The prepolymer containing propane slurry was continuously discharged from the prepolymerization unit into the first gas-phase reactor. To the prepolymerization unit hydrogen was also fed in order to control the molecular weight of the prepolymer. To the first and the second gas-phase reactor propane was fed in order to better control the reactivity of the system.

| Main operating Conditions. | | |
|---|---|---|
| Activation Step | | |
| Temperature | (°C.) | = 10 |
| Residence Time | (min) | = 2.9 |
| TEAL/Ti | (by mol) | = 40 |
| Prepolymerization Step | | |
| Temperature | (°C.) | = 20 |
| Prepolymerization ratio | (g cat./g prepol.) | = 1/300 |
| 1st Gas Phase Reactor | | |
| Temperature | (°C.) | = 85 |
| Pressure | (barg) | = 25 |
| Ethylene | (% mol) | = 16.7 (*) |
| Hydrogen | (% mol) | = 12.3 (*) |
| Propane | (% mol) | = 69.9 (*) |
| 1st step polymerization % | | = 32 |
| 2nd Gas Phase Reactor | | |
| Temperature | (°C.) | = 85 |
| Pressure | (barg) | = 22 |
| Ethylene | (% mol) | = 27.2 (*) |
| Hydrogen | (% mol) | = 20.1 (*) |
| Propane | (% mol) | = 51.8 (*) |
| Final Product Characteristics | | |
| Final mileage | (Kg PE/g solid catalyst component) | = 11.3 |
| Real density | (kg/l) | = 0.961 |
| Melt index "E" | (g/10 min) | = 7.1 |
| Poured bulk density | (kg/l) | = 0.414 |
| particle size: | | |
| ø > 2,000 µm | (% wt) | = 40.4 |
| ø > 1,000 µm | (% wt) | = 55.8 |
| ø > 500 µm | (% wt) | = 3.0 |
| ø < 500 µm | (% wt) | = 0.8 |

Remark: (*) The balance to 100% being due to other inerts (ethane, butane, etc.) present in the monomers fed.

Example 2

A pilot plant having the configuration shown in FIG. 1 was used to produce LLDPE. The solid component prepared according to the general procedure and a solution of TEAL in n-hexane were fed to the activation step and from this to a slurry prepolymerization step with ethylene. The liquid phase of the suspension was propane. The prepolymer containing propane slurry was continuously discharged from the prepolymerization unit into the first gas-phase reactor. To the prepolymerization unit hydrogen was also fed in order to control the molecular weight of the prepolymer. To the first and the second gas-phase reactor propane was fed in order to better control the reactivity of the system.

| Main operating conditions. | | |
|---|---|---|
| Activation Step | | |
| Temperature | (°C.) | = 2.8 |
| Residence Time | (min) | = 2.9 |
| TEAL/Ti | (by mol) | = 40 |
| Prepolymerization Step | | |
| Temperature | (°C.) | = 30 |
| Prepolymerization ratio | (g cat./g prepol.) | = 1/250 |
| 1st Gas Phase Reactor | | |
| Temperature | (°C.) | = 65 |
| Pressure | (barg) | = 22 |
| Ethylene | (% mol) | = 9.7 (*) |
| Butene-1 | (% mol) | = 3.2 (*) |
| Hydrogen | (% mol) | = 2.1 (*) |
| Propane | (% mol) | = 85.0 (*) |
| 1st step polymerization % | | = 25 |
| 2nd Gas Phase Reactor | | |
| Temperature | (°C.) | = 80 |
| Pressure | (barg) | = 20 |
| Ethylene | (% mol) | = 33.3 (*) |
| Butene-1 | (% mol) | = 10.2 (*) |
| Hydrogen | (% mol) | = 6.9 (*) |
| Propane | (% mol) | = 47.6 (*) |
| Final Product Characteristics | | |
| Final mileage | (Kg PE/g solid catalyst component) | = 14.5 |
| Real density | (kg/l) | = 0.918 |
| Melt index "E" | (g/10 min) | = 0.97 |
| Poured bulk density | (kg/l) | = 0.364 |
| particle size: | | |
| ⌀ > 2,000 μm | (% wt) | = 55.0 |
| ⌀ > 1,000 μm | (% wt) | = 43.4 |
| ⌀ > 500 μm | (% wt) | = 1.5 |
| ⌀ < 500 μm | (% wt) | = 0.1 |

Remark: (*) The balance to 100% being due to other inerts (ethane, butane, etc.) present in the monomers fed.

Example 3

In order to produce LLDPE a pilot plant was used having the same configuration as shown in FIG. 1, but with one single gas-phase polymerization step, and with the produced polymer being recovered after being discharged from the reactor 4 into the separation unit 5. The pretreatment and prepolymerization step was completely analogous to that as described in Examples 1 and 2. To the gas phase reactor, propane was fed in order to better control the reactivity of the system.

| Main operating conditions. | | |
|---|---|---|
| Activation Step | | |
| Temperature | (°C.) | = 16 |
| Residence Time | (min) | = 20 |
| TEAL/Ti | (by mol) | = 45 |
| Prepolymerization Step | | |
| Temperature | (°C.) | = 30 |
| Prepolymerization ratio | (g cat./g prepol.) | = 1/350 |
| Gas Phase Polymerization Step | | |
| Temperature | (°C.) | = 80 |
| Pressure | (barg) | = 20 |
| Ethylene | (% mol) | = 13.9 (*) |
| Butene-1 | (% mol) | = 4.8 (*) |
| Hydrogen | (% mol) | = 2.4 (*) |
| Propane | (% mol) | = 78.1 (*) |
| Final Product Characteristics | | |
| Final mileage | (Kg PE/g solid catalyst component) | = 11.0 |
| Real density | (kg/l) | = 0.9197 |
| Melt index "E" | (g/10 min) | = 1.04 |
| Poured bulk density | (kg/l) | = 0.35 |
| particle size: | | |
| ⌀ > 2,000 μm | (% wt) | = 31.2 |
| ⌀ > 1,000 μm | (% wt) | = 62.2 |
| ⌀ > 500 μm | (% wt) | = 5.3 |
| ⌀ < 500 μm | (% wt) | = 1.3 |

Remark: (*) The balance to 100% being due to other inerts (ethane, butane, etc.) present in the monomers fed.

We claim:

1. A continuous process for obtaining spheriform polymers by the gas-phase polymerization of ethylene and its mixtures with α-olefins $CH_2=CHR$, where R is an alkyl, cycloalkyl or aryl radical having 1–12 carbon atoms, using a catalyst comprising the product of reaction of the following components: (A) a Ti compound containing at least one Ti-halogen bond supported on an active Mg-dihalide; and (B) an Al-alkyl compound; characterized in that it comprises the following steps:

(a) contacting the catalyst components in the absence of polymerizable olefin or in the presence of polymerizable olefin in amounts not greater than about 20 g per g of solid catalyst component (A), said contacting being carried out at a temperature lower than 60° C. for about 6 seconds to 60 minutes;

(b) prepolymerizing with the catalyst prepared as described under (a) ethylene or ethylene mixtures with one or more α-olefin(s) to form a polymer, containing up to 20% by mol of said α-olefin, in an amount from 100 to 1000 g/g of solid catalyst component, said prepolymerizing step being carried out at a temperature of from −30° C. to 50° C.;

(c) polymerizing ethylene or ethylene mixtures with α-olefins $CH_2=CHR$ in the gas phase in one or more reactors having a fluidized or mechanically stirred bed, using the prepolymer-catalyst system coming from (b), and circulating through the reactors an alkane having from 3 to 5 carbon atoms, the molar concentration of the alkane being from 20 to 90% with respect to the total gases.

2. The process according to claim 1, wherein the polymerization is carried out in two reactors, in the first of which from 5 to 60% by weight of the total polymer is produced, and wherein the concentration of alkane is higher in the first reactor than in the second reactor.

3. The process according to claim 1, wherein the Ti compound contains at least one Ti-halogen bond and at least one Ti-OR' bond, said R' being an alkyl, cycloalkyl or aryl radical having 1–12 carbon atoms or a —COR group.

4. The process according to claim 1, wherein the alkane is propane.

5. The process according to claim 1, wherein the amount of prepolymer produced in step (b) is between 100 and 400 g/g of solid catalyst component.

6. The process according to claim 1, wherein the olefin $CH_2=CHR$ is selected from butene-1, pentene-1, hexene-1, 4-methyl-pentene-1, octene-1.

7. The process according to claim 1, wherein an internal electron donor is present in component (A).

8. The process according to claim 7, wherein an external donor compound (C) is present in the catalyst.

9. The process according to claim 7, wherein the internal electron donor is selected from ethers, diethers, esters, amines, ketones.

10. The process according to claim 9, wherein the internal electron donor is an ester of an aromatic carboxylic acid.

11. The process according to claim 1, wherein the Al-alkyl compound is an Al-trialkyl compound.

12. The process according to claim 1, wherein the component (A) is of spherical shape.

* * * * *